US012343988B2

(12) United States Patent
Kawakami

(10) Patent No.: US 12,343,988 B2
(45) Date of Patent: Jul. 1, 2025

(54) FLOW PATH UNIT AND LIQUID EJECTING DEVICE

(71) Applicant: SEIKO EPSON CORPORATION, Tokyo (JP)

(72) Inventor: Ryo Kawakami, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 171 days.

(21) Appl. No.: 18/185,953

(22) Filed: Mar. 17, 2023

(65) Prior Publication Data

US 2023/0294416 A1 Sep. 21, 2023

(30) Foreign Application Priority Data

Mar. 18, 2022 (JP) ................................ 2022-043561

(51) Int. Cl.
*B41J 2/045* (2006.01)
*B41J 2/14* (2006.01)
*B41J 2/17* (2006.01)

(52) U.S. Cl.
CPC ......... *B41J 2/0454* (2013.01); *B41J 2/04563* (2013.01); *B41J 2/04571* (2013.01); *B41J 2/14088* (2013.01); *B41J 2/1707* (2013.01); *B41J 2002/14177* (2013.01)

(58) Field of Classification Search
CPC .... B41J 2/1707; B41J 2/0454; B41J 2/04563; B41J 2/04571; B41J 2/14088; B41J 2002/14177
See application file for complete search history.

(56) References Cited

U.S. PATENT DOCUMENTS 4,459,469 A * 7/1984 Ishima .................... B41J 2/195 219/505
6,988,542 B2 * 1/2006 Hughes .................. F28F 1/405 165/164
2013/0194326 A1 8/2013 Ito

FOREIGN PATENT DOCUMENTS

JP 2022-001448 A 1/2022

* cited by examiner

*Primary Examiner* — Geoffrey S Mruk
(74) *Attorney, Agent, or Firm* — WORKMAN NYDEGGER

(57) ABSTRACT

In a flow path unit, ink flows toward a recording head that ejects the ink. The flow path unit includes a flow path portion, a temperature adjustment unit, and a compression coil spring. The flow path portion is formed of metal and includes a supply pipe through which the ink flows. The temperature control unit heats the supply pipe. The compression coil spring is formed of metal and is attached to an inner surface of the supply pipe. The ink can come into contact with the compression coil spring, and the compression coil spring enables the ink to flow downstream in the supply pipe.

11 Claims, 10 Drawing Sheets

FLOW PATH UNIT AND LIQUID EJECTING DEVICE

The present application is based on, and claims priority from JP Application Serial Number 2022-043561, filed Mar. 18, 2022, the disclosure of which is hereby incorporated by reference herein in its entirety.

BACKGROUND

1. Technical Field

The present disclosure relates to a flow path unit and a liquid ejection device.

2. Related Art

A printer disclosed in JP-A-2022-1448 includes a first heat source that heats a flat plate flow path in an ink supply path. The flat plate flow path is constituted by a plurality of grooves formed in a metal plate.

In the printer disclosed in JP-A-2022-1448, the length of the flow path is extended by causing the groove to meander. However, when an installation space for the flow path is limited, it is not possible to cause the groove to meander, and there is a risk that a heating amount for a liquid may become insufficient.

SUMMARY

A flow path unit according to an aspect of the present disclosure for solving the problem described above is a flow path unit through which a liquid flows toward an ejecting unit configured to eject the liquid. The flow path unit includes a flow path portion formed of metal and including a flow path through which the liquid flow, a heating unit configured to heat the flow path portion, and an attachment portion formed of metal and attached to an inner surface of the flow path. The attachment portion is configured to come into contact with the liquid and cause the liquid to flow downstream in the flow path.

A liquid ejecting device according to an aspect of the present disclosure for solving the problem described above includes an ejecting unit configured to eject a liquid, a flow path portion formed of metal and including a flow path through which the liquid flows toward the ejecting unit, a heating unit configured to heat the flow path portion, and an attachment portion formed of metal and attached to an inner surface of the flow path. The attachment portion is configured to come into contact with the liquid and cause the liquid to flow downstream in the flow path.

DESCRIPTION OF EXEMPLARY EMBODIMENTS

Figure 1:
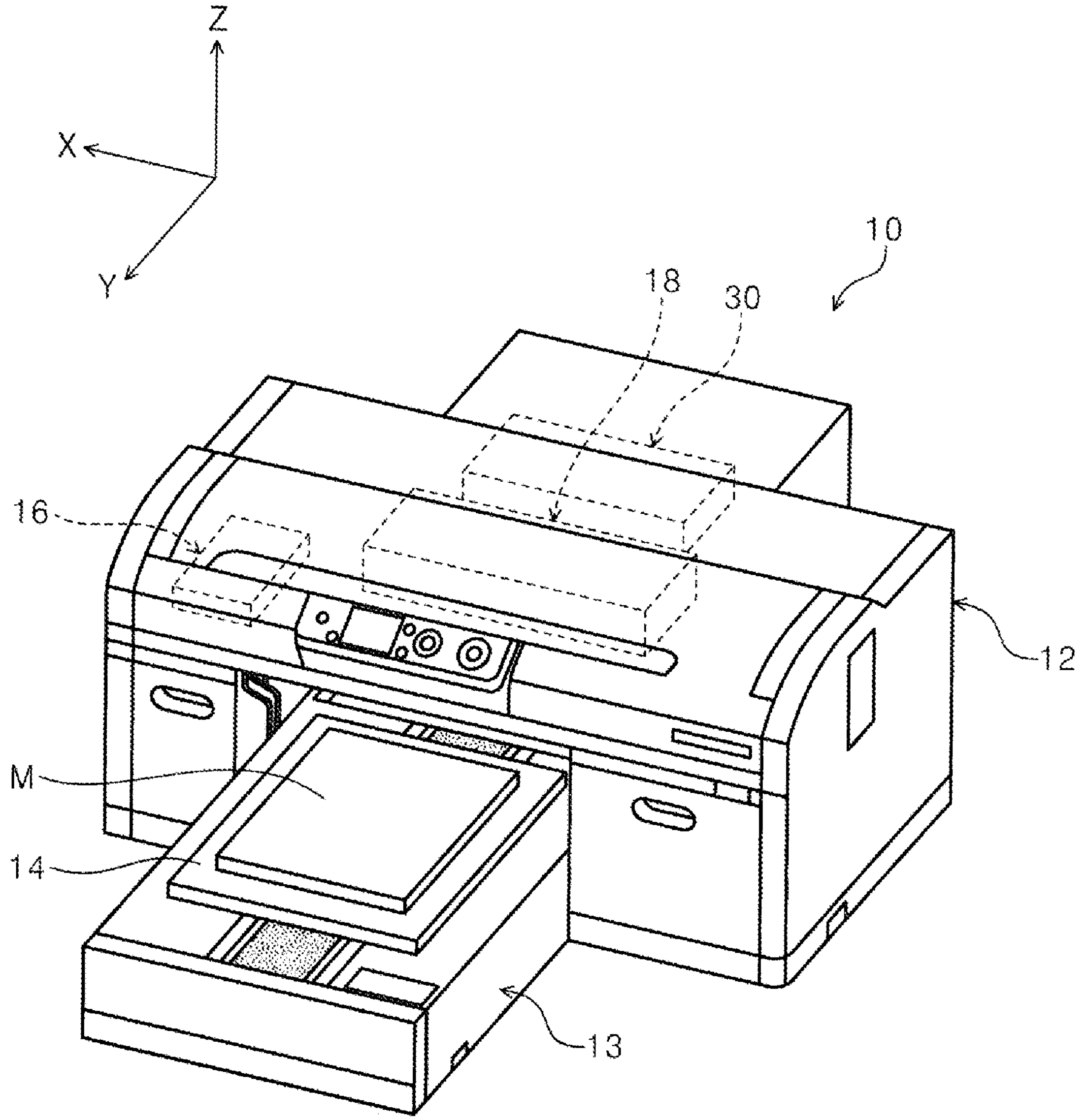
FIG. 1 is a perspective view illustrating an overall configuration of a printer according to a first embodiment.

Hereinafter, the present disclosure will be schematically described.

A flow path unit according to a first aspect is a flow path unit through which a liquid flows toward an ejecting unit configured to eject the liquid. The flow path unit includes a flow path portion formed of metal and including a flow path through which the liquid flow, a heating unit configured to heat the flow path portion, and an attachment portion formed of metal and attached to an inner surface of the flow path. The attachment portion is configured to come into contact with the liquid and cause the liquid to flow downstream in the flow path.

According to this aspect, since the attachment portion is attached to the flow path, the surface area of a portion, in the flow path, that comes in contact with the liquid is increased, and thus the heat transfer efficiency from the heating unit to the liquid in the flow path is improved compared to a configuration in which the attachment portion is not provided. In this way, in a configuration in which an installation space for the flow path is limited, it is possible to prevent a heating amount for the liquid from becoming insufficient. Further, since the attachment portion is attached to the inner surface of the flow path in a state in which the liquid can flow, the attachment portion does not inhibit the liquid from flowing through the flow path.

In a flow path unit according to a second aspect, with respect to the first aspect, the attachment portion is a compression coil spring, and the compression coil spring is disposed such that a natural length direction of the compression coil spring coincides with a direction in which the liquid flows through the flow path.

According to this aspect, when the compression coil spring is extended in the natural length direction, the diameter of the compression coil spring becomes smaller than the diameter of the compression coil spring in a unloaded state. As a result, it becomes easier to insert the compression coil spring into the flow path, and thus an operation of attaching the attachment portion to the inner surface of the flow path can be easily performed.

In a flow path unit according to a third aspect, with respect to the first aspect, a thermal conductivity of the attachment portion is equal to or greater than a thermal conductivity of the metal forming the flow path portion.

According to this aspect, since the thermal conductivity of the attachment portion is equal to or greater than the thermal conductivity of the metal forming the flow path portion, the thermal energy supplied from the heating unit to the flow path portion is easily transferred to the attachment portion, and it is thus possible to prevent the thermal energy supplied to the liquid from becoming insufficient.

In a flow path unit according to a fourth aspect, with respect to the first aspect, a surface area of a portion, of the attachment portion, configured to come into contact with the liquid decreases the further downstream in a direction in which the liquid flows through the flow path.

According to this aspect, since the surface area of the portion, of the attachment portion, configured to come into contact with the liquid decreases the further downstream in the direction of the liquid flowing through the flow path, a pressure loss caused by the contact between the liquid and the attachment portion can be reduced downstream in the flow path.

A liquid ejecting device according to a fifth aspect includes an ejecting unit configured to eject a liquid, a flow path portion formed of metal and including a flow path through which the liquid flows toward the ejecting unit, a heating unit configured to heat the flow path portion, and an attachment portion formed of metal and attached to an inner surface of the flow path. The attachment portion is configured to come into contact with the liquid and cause the liquid to flow downstream in the flow path.

According to this aspect, since the attachment portion is attached to the flow path, the surface area of a portion, in the flow path, that comes in contact with the liquid is increased, and thus the heat transfer efficiency from the heating unit to the liquid in the flow path is improved compared to a configuration in which the attachment portion is not provided. In this way, in the configuration in which the installation space for the flow path is limited, it is possible to prevent the heating amount for the liquid from becoming insufficient. Further, since the attachment portion is attached to the inner surface of the flow path in a state in which the liquid can flow, the attachment portion does not inhibit the liquid from flowing through the flow path. Due to these actions, it is possible to inhibit the temperature of the liquid when the liquid reaches the ejecting unit from becoming lower than a set temperature.

First Embodiment

Hereinafter, a printer 10 and a flow path unit 30 according to a first embodiment of the present disclosure will be specifically described.

As illustrated in FIG. 1, the printer 10 is an example of a liquid ejecting device that performs recording by ejecting ink K (FIG. 2) onto a medium M. The printer 10 performs the recording on the medium M by a recording head 18 described later.

The medium M is a recording medium on which an image is recorded. Examples of the medium M include fabrics or paper. In addition, the medium M is drawn out from the front of the printer 10 as an example. Note that an X-Y-Z coordinate system illustrated in each drawing is an orthogonal coordinate system.

An X direction is the device width direction of the printer 10, and is a horizontal direction. A tip side of an arrow indicating the X direction is defined as a +X direction, and a base end side of the arrow indicating the X direction is defined as a −X direction. In addition, the X direction is an example of the width direction of the medium M.

A Y direction is the depth direction of the printer 10 and is a horizontal direction. A tip side of an arrow indicating the Y direction is defined as a +Y direction, and a base end side of the arrow indicating the Y direction is defined as a −Y direction. The +Y direction is an example of a transport direction of the medium M. The −Y direction is a direction opposite to the +Y direction.

A Z direction is an example of the height direction of the printer 10. In addition, the Z direction is an example of an intersecting direction intersecting the Y direction. A tip side of an arrow indicating the Z direction is defined as a +Z direction, and a base end side of the arrow indicating the Z direction is defined as a −Z direction. The −Z direction is a direction in which gravity acts.

Figure 2:
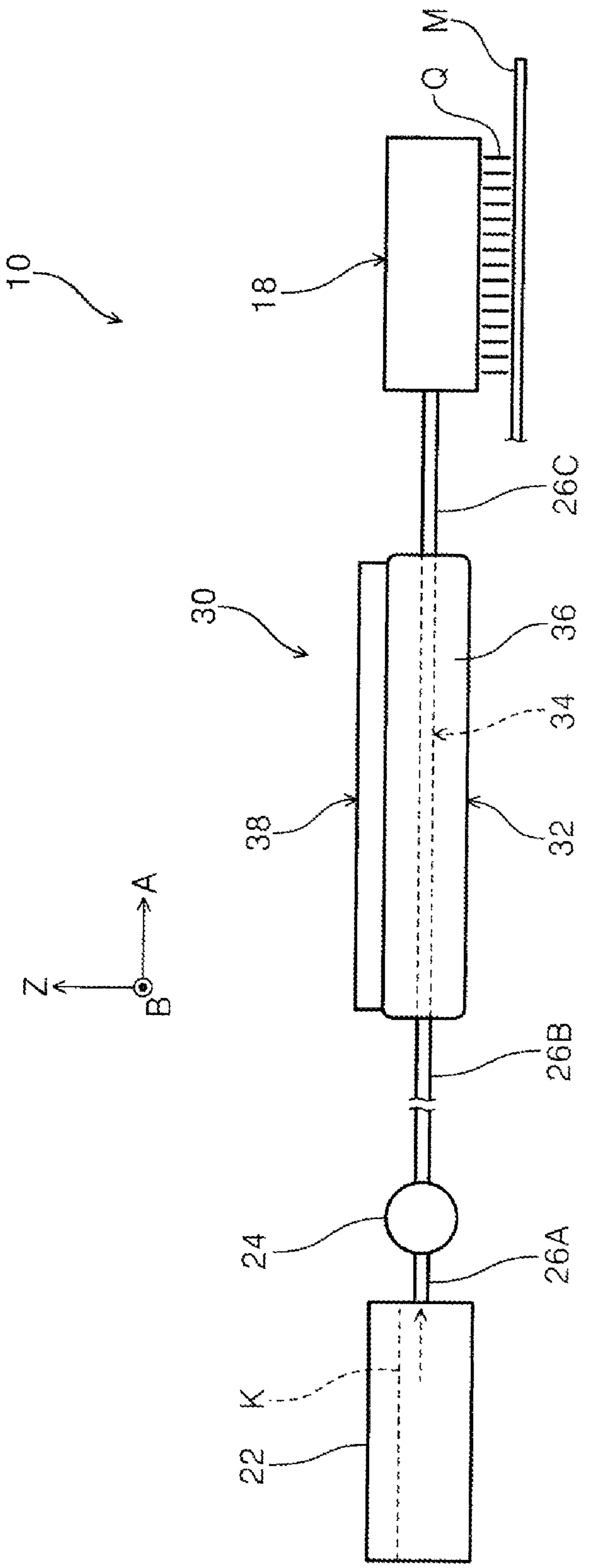
FIG. 2 illustrates a schematic view illustrating a configuration, from an ink tank to a recording head, of the printer according to the first embodiment.

As illustrated in FIGS. 1 and 2, the printer 10 includes, for example, a main body 12, a support unit 13, a tray 14, a control unit 16, the recording head 18, an ink tank 22, a pump 24, pipes 26A, 26B, 26C, and the flow path unit 30.

The main body unit 12 constitutes a device main body of the printer 10.

The support unit 13 supports the medium M via the tray 14. In addition, the support unit 13 includes a motor (not illustrated), and supports the tray 14 so that the tray 14 is movable in the +Y direction.

The tray 14 is provided to be movable in the +Y direction at the support unit 13. The medium M is placed on the tray 14.

The control unit 16 includes, for example, a central processing unit (CPU), a memory, and a storage, all of which are not illustrated. A program can be developed in a portion of the memory. The control unit 16 controls an operation of the flow path unit 30 described later by executing the program. Note that, in this embodiment, as an example, the control unit 16 controls not only the operation of the flow path unit 30 but also operations such as recording and discharging at each component of the printer 10.

As illustrated in FIG. 2, the recording head 18 is an example of an ejecting unit that ejects the ink K. The ink K is an example of a liquid. Specifically, the recording head 18 ejects the ink K toward the medium M as ink droplets Q, which are an example of liquid droplets.

The ink K is made of, for example, UV ink that is cured by ultraviolet irradiation. The ink K of the medium M is cured by a UV irradiation unit (not illustrated). The ink K is preferably used within a temperature range in which a lower limit value and an upper limit value are set in advance, from the viewpoint of ensuring the fluidity of the ink K and the image quality, and also from the viewpoint of the durability of the recording head 18.

Note that, as an example, the recording head 18 is provided on a carriage (not illustrated) that can reciprocate in the X direction, but the recording head 18 may be configured as a line head.

The ink tank 22 is an example of a storage unit that stores the ink K.

The pump 24 is an example of a feeding unit that pressurizes the ink K flowing from the ink tank 22, and that feeds the ink K toward the flow path unit 30 and the recording head 18.

The pipe 26A couples the ink tank 22 and the pump 24 so that the ink K can flow therethrough. The pipe 26B couples the pump 24 and a flow path portion 32 described later so that the ink K can flow therethrough. The pipe 26C couples the flow path portion 32 and the recording head 18 so that the ink K can flow therethrough.

The printer 10 includes the flow path unit 30.

Figure 4:
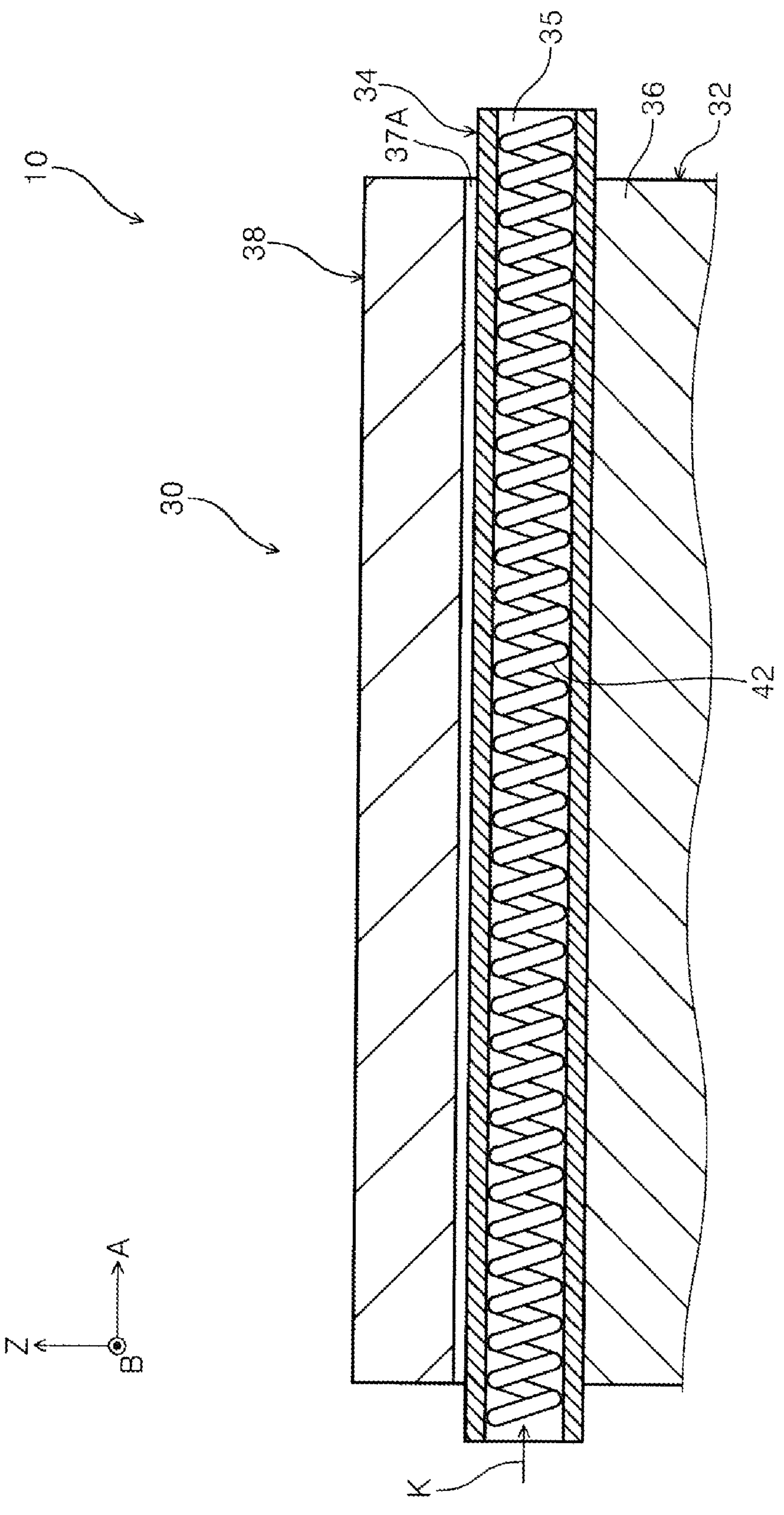
FIG. 4 is a vertical cross-sectional view illustrating a portion of the flow path unit according to the first embodiment.

The flow path unit 30 is a unit through which the ink K flows toward the recording head 18. As an example, the flow path unit 30 includes the flow path portion 32, a temperature adjustment unit 38, and a compression coil spring 42 (FIG. 4).

Figure 3:
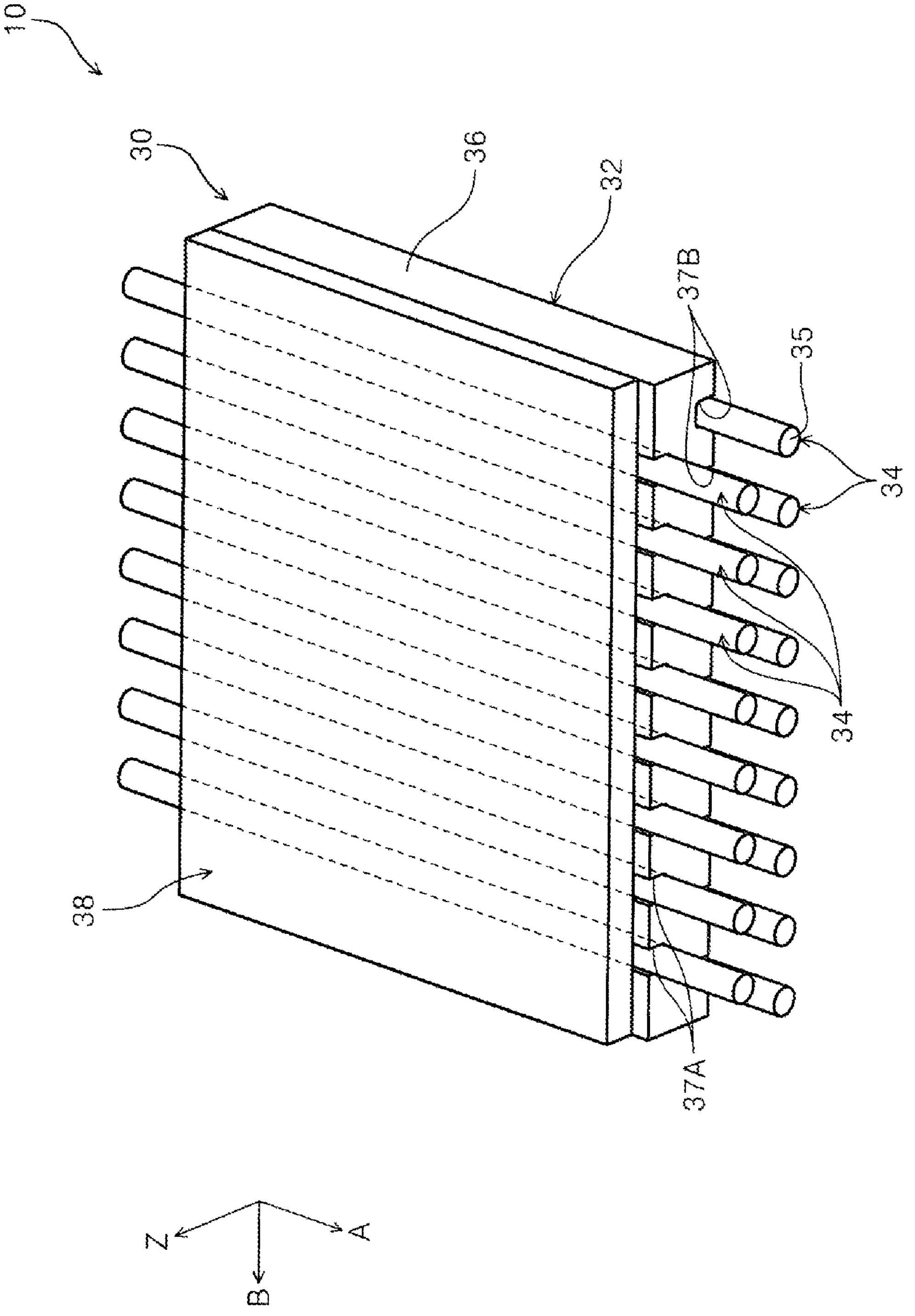
FIG. 3 is a perspective view illustrating a flow path unit according to the first embodiment.

As illustrated in FIG. 3, the flow path portion 32 is formed of aluminum or stainless steel as an example of metal. The flow path portion 32 includes a plurality of supply pipes 34 that are an example of a flow path through which the ink K flows, and a support member 36 that supports the plurality of supply pipes 34. Each of the plurality of supply pipes 34 extends linearly.

A direction in which the plurality of supply pipes 34 extend is referred to as an A direction. The A direction is a direction intersecting the Z direction. A tip side of an arrow indicating the A direction is defined as a +A direction and a base end side of the arrow is defined as a −A direction. In addition, a direction intersecting both the Z direction and the A direction is referred to as a B direction. A tip side of an arrow indicating the B direction is defined as a +B direction and a base end side of the arrow is defined as a −B direction.

The +A direction is a natural length direction of the compression coil spring 42 (FIG. 4) described later.

The support member 36 is a flat plate-shaped member having a predetermined thickness in the Z direction. The support member 36 is formed of aluminum as an example of metal. The support member 36 is provided with a plurality of upper grooves 37A and a plurality of lower grooves 37B.

The plurality of upper grooves 37A are provided at an end portion of the support member 36 in the +Z direction. Each of the plurality of upper grooves 37A has a U-shaped cross-section opening in the +Z direction when viewed from the A direction. The plurality of upper grooves 37A are arranged at intervals in the B direction.

The plurality of lower grooves 37B are provided at an end portion of the support member 36 in the −Z direction. Each of the plurality of lower grooves 37B has a U-shaped cross section opening in the −Z direction when viewed from the A direction. The plurality of lower grooves 37B are arranged at intervals in the B direction.

The plurality of upper grooves 37A and the plurality of lower grooves 37B are alternately arranged in a staggered manner in the +Z direction and the −Z direction with respect to the B direction. Note that the upper groove 37A and the lower groove 37B have substantially the same size. In other words, the upper groove 37A and the lower groove 37B have substantially the same length in the A direction, the same width in the B direction, and the same depth in the Z direction. In addition, each of the upper groove 37A and the lower groove 37B has a size into which the supply pipe 34 can be inserted.

The supply pipe 34 is a cylindrical member having the central axis extending in the A direction. The supply pipe 34 has an inner surface 35. The supply pipe 34 is formed of stainless steel as an example of metal. As an example, the length of the supply pipe 34 in the A direction is longer than the length of the support member 36 in the A direction. An end portion of the supply pipe 34 in the −A direction is coupled to the pipe 26B (FIG. 2). An end portion of the supply pipe 34 in the +A direction is coupled to the pipe 26C (FIG. 2). Here, each of the plurality of supply pipes 34 is inserted into the upper groove 37A or the lower groove 37B, and is fixed to the support member 36. In this way, when the support member 36 is heated, thermal energy can be transferred from the support member 36 to the plurality of supply pipes 34.

The temperature adjustment unit 38 is an example of a heating unit that heats the flow path portion 32. Specifically, the temperature adjustment unit 38 is attached to an end surface of the support member 36 in the +Z direction. The temperature adjustment unit 38 includes a planar heater that generates heat using electric power supplied from a power source (not illustrated). The temperature adjustment unit 38 can heat a portion of each of the plurality of supply pipes 34 supported by the support member 36 as well as the support member 36.

Here, the control unit 16 (FIG. 1) can perform control to increase or decrease the amount of electric power supplied to the temperature adjustment unit 38, based on a measurement result of a temperature sensor (not illustrated) that measures the temperature of the ink K of the recording head 18 (FIG. 1). In this way, the temperature adjustment unit 38 is configured to be able to adjust the heating temperature of the ink K.

As illustrated in FIG. 4, the compression coil spring 42 is an example of an attachment portion that is attached to the inner surface 35. The compression coil spring 42 is formed of gold-plated brass as an example of metal. In other words, the thermal conductivity of the compression coil spring 42 is equal to or greater than the thermal conductivity of the stainless steel forming the flow path portion 32. Note that the thermal conductivity of each member described in this embodiment is a thermal conductivity based on JIS H7903.

The ink K can come into contact with the compression coil spring 42, and the compression coil spring 42 enables the ink K to flow downstream in the +A direction of the supply pipe 34. Since the compression coil spring 42 is hollow and has an annular shape when viewed in the A direction, the ink K can flow through at least an inner portion, in the radial direction, of the compression coil spring 42.

The compression coil spring 42 extends along the +A direction. In other words, the compression coil spring 42 is disposed such that a natural length direction of the compression coil spring 42 coincides with the +A direction that is a direction in which the ink K flows through the supply pipe 34. The natural length direction is a direction in which the natural length of the compression coil spring 42 is measured.

The outer diameter of the compression coil spring 42 in an unloaded state is equal to or greater than the inner diameter of the supply pipe 34. When attaching the compression coil spring 42 to the supply pipe 34, in a state in which one end in the +A direction of the compression coil spring 42 is held, the other end in the +A direction thereof is pulled in the +A direction using a tool or the like. As a result, the outer diameter of the compression coil spring 42 temporarily becomes smaller than the inner diameter of the supply pipe 34. The compression coil spring 42 having a smaller outer diameter than the inner diameter of the supply pipe 34 is inserted into the supply pipe 34. Then, the tensile force acting on the compression coil spring 42 is released. As a result, the compression coil spring 42 attempts to return to the unloaded state, and the outer diameter of the compression coil spring 42 in the unloaded state is equal to or greater than the inner diameter of the supply pipe 34. Thus, an outer circumferential portion of the compression coil spring 42 is held in contact with the inner surface 35 of the supply pipe 34. In this way, the compression coil spring 42 is attached to the supply pipe 34.

Next, actions of the printer 10 and the flow path unit 30 will be described. Note that each of configurations will be described with reference to FIGS. 1 to 4, and the description of individual drawing numbers may be omitted.

When the measured temperature of the ink K is lower than a set temperature, the control unit 16 operates the temperature adjustment unit 38 to heat the flow path portion 32.

The ink K in the ink tank 22 is sent to the flow path portion 32 as a result of the pump 24 being operated.

Here, by the supply pipes 34 and the support member 36 being heated by the temperature adjustment unit 38 in the flow path portion 32, thermal energy is indirectly transferred from the support member 36 to the supply pipes 34, or directly transferred to the supply pipes 34. Further, the thermal energy is transferred from the supply pipe 34 to the compression coil spring 42. As a result, the thermal energy is supplied to the ink K flowing in the supply pipe 34 not only from the supply pipe 34 but also from the compression coil spring 42, and thus it becomes easier to increase the temperature of the ink K.

The ink K of the increased temperature is ejected onto the medium M at the recording head 18.

As described above, according to the flow path unit 30, as a result of the compression coil spring 42 being attached to the supply pipe 34, the surface area of a portion, in the supply pipe 34, that comes into contact with the ink K is increased, and thus the heat transfer efficiency from the temperature adjustment unit 38 to the ink K in the supply pipe 34 is improved compared to a configuration in which the compression coil spring 42 is not provided. In this way, in a configuration in which an installation space for the supply pipe 34 is limited, it is possible to prevent the heating amount for the ink K from becoming insufficient. Further, since the compression coil spring 42 is attached to the inner surface 35 of the supply pipe 34 in a state in which the ink K can flow, the compression coil spring 42 does not inhibit the ink K from flowing in the supply pipe 34.

According to the flow path unit 30, when the compression coil spring 42 is extended in the +A direction, the diameter of the compression coil spring 42 becomes smaller than the diameter of the compression coil spring 42 in the unloaded state. As a result, it becomes easier to insert the compression coil spring 42 into the supply pipe 34, and thus an operation of attaching the compression coil spring 42 to the inner surface 35 of the supply pipe 34 can be easily performed.

According to the flow path unit 30, since the thermal conductivity of the compression coil spring 42 is equal to or greater than the thermal conductivity of the metal forming the flow path portion 32, the thermal energy supplied from the temperature adjustment unit 38 to the flow path portion 32 is easily transferred to the compression coil spring 42, and it is thus possible to prevent the thermal energy supplied to the ink K from becoming insufficient.

According to the printer 10, since the compression coil spring 42 is attached to the supply pipe 34, the surface area of the portion, in the supply pipe 34, that comes in contact with the ink K is increased, and thus the heat transfer efficiency from the temperature adjustment unit 38 to the ink K in the supply pipe 34 is improved compared to a configuration in which the compression coil spring 42 is not provided. In this way, in the configuration in which the installation space for the supply pipe 34 is limited, it is possible to prevent the heating amount for the ink K from becoming insufficient. Further, since the compression coil spring 42 is attached to the inner surface 35 of the supply pipe 34 in a state in which the ink K can flow, the compression coil spring 42 does not inhibit the ink K from flowing through the supply pipe 34. Due to these actions, it is possible to inhibit the temperature of the ink K when the ink K reaches the recording head 18 from becoming lower than the set temperature.

Second Embodiment

Hereinafter, the printer 10 and a flow path unit 50 according to a second embodiment will be specifically described. Note that the same components as those of the printer 10 will be denoted by the same reference signs, and the description thereof will be omitted.

Figure 5:
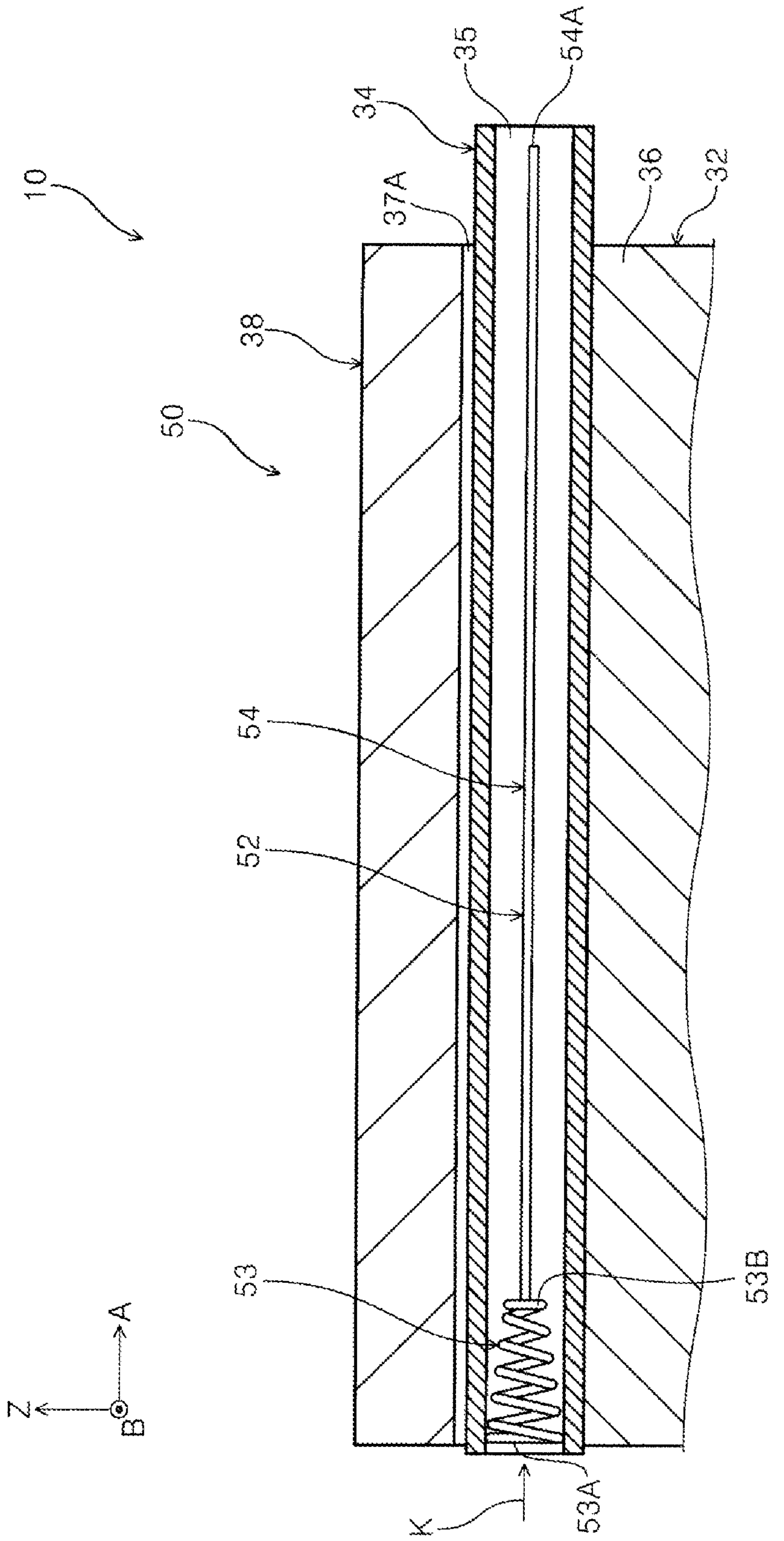
FIG. 5 is a vertical cross-sectional view illustrating a portion of a flow path unit according to a second embodiment.

As illustrated in FIG. 5, in the printer 10, the flow path unit 50 is provided in place of the flow path unit 30 (FIG. 2). The configuration of the printer 10 other than the flow path unit 50 is the same as that of the first embodiment.

The flow path unit 50 is a unit in which the ink K flows toward the recording head 18 (FIG. 2). In addition, the flow path unit 50 has a configuration in which a conical spring 52 is provided in place of the compression coil spring 42 (FIG. 4) in the flow path unit 30. The configuration of the flow path unit 50 other than the conical spring 52 is the same as that of the flow path unit 30.

The conical spring 52 is an example of the attachment portion that is attached to the inner surface 35. The conical spring 52 is formed of gold-plated brass as an example of metal. In other words, the thermal conductivity of the conical spring 52 is equal to or greater than the thermal conductivity of the stainless steel forming the flow path portion 32.

The conical spring 52 includes, for example, an elastic portion 53 and a rod-shaped portion 54.

The elastic portion 53 is a portion that can elastically deform in the A direction. Specifically, the elastic portion 53 is a portion obtained by processing a linear member into a spiral and conical shape whose outer diameter decreases the further toward the +A direction when viewed from the A direction. In other words, the elastic portion 53 is hollow and has an annular shape when viewed in the A direction.

A base end portion 53A in the −A direction of the elastic portion 53 has a size that can be press-fitted into the supply pipe 34. As a result, by press-fitting the base end portion 53A into the supply pipe 34, the conical spring 52 is attached to the supply pipe 34. A tip portion 53B in the +A direction of the elastic portion 53 is not in contact with the inner surface 35. In other words, the tip portion 53B is located closer to the center of the circle than the base end portion 53A is, when viewed in the A direction.

The rod-shaped portion 54 is a columnar portion that extends such that the axial direction thereof is in the A direction. The outer diameter of the rod-shaped portion 54 is substantially the same as the thickness of a linear portion of the elastic portion 53. The rod-shaped portion 54 extends in the +A direction from the tip portion 53B. In the A direction, the rod-shaped portion 54 is longer than the elastic portion 53. In other words, a range in which the rod-shaped portion 54 faces the inner surface 35 is wider than a range in which the elastic portion 53 faces the inner surface 35.

The rod-shaped portion 54 is separated from the inner surface 35 as a result of being supported by the elastic portion 53. Note that, although FIG. 5 illustrates that a tip portion 54A in the +A direction of the rod-shaped portion 54 is not in contact with the inner surface 35, the tip portion 54A may be in contact with a portion of the inner surface 35.

The ink K can come into contact with conical spring 52, and the conical spring 52 enables the ink K to flow downstream in the +A direction of the supply pipe 34. The surface area per unit space of a portion, of the conical spring 52, that can come into contact with the ink K decreases the further downstream in the +A direction in which the ink K flows through the supply pipe 34. In other words, the contact area between the tip portion 54A and the inner surface 35 is smaller than the contact area between the base end portion 53A and the inner surface 35.

Note that, as an example, the temperature adjustment unit 38 is disposed so as to overlap with a portion of the elastic portion 53 and the rod-shaped portion 54 in a projected view in the Z direction.

Next, actions of the flow path unit 50 according to the second embodiment will be described.

Thermal energy is transferred from the supply pipe 34 to the conical spring 52. In this way, the thermal energy is supplied to the ink K flowing through the supply pipe 34 not only from the supply pipe 34 but also from the conical spring 52, and thus it becomes easier to increase the temperature of the ink K. The ink K of the increased temperature is ejected onto the medium M at the recording head 18 (FIG. 2).

As described above, according to the flow path unit 50, as a result of the conical spring 52 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the conical spring 52 is not provided. In this way, in the configuration in which the installation space for the supply pipe 34 is limited, it is possible to prevent the heating amount for the ink K from becoming insufficient. Further, since the conical spring 52 is attached to the inner surface 35 of the supply pipe 34 in the state in which the ink K can flow, the conical spring 52 does not inhibit the ink K from flowing in the supply pipe 34.

According to the flow path unit 50, since the surface area per unit space of the portion, of the conical spring 52, that can come into contact with the ink K decreases the further downstream in the +A direction in which the ink K flows through the supply pipe 34, a pressure loss caused by the contact between the ink K and the conical spring 52 can be reduced downstream in the supply pipe 34.

Third Embodiment

Hereinafter, the printer 10 and a flow path unit 60 according to a third embodiment will be specifically described. Note that the same components as those of the printer 10 will be denoted by the same reference signs, and the description thereof will be omitted.

Figure 6:
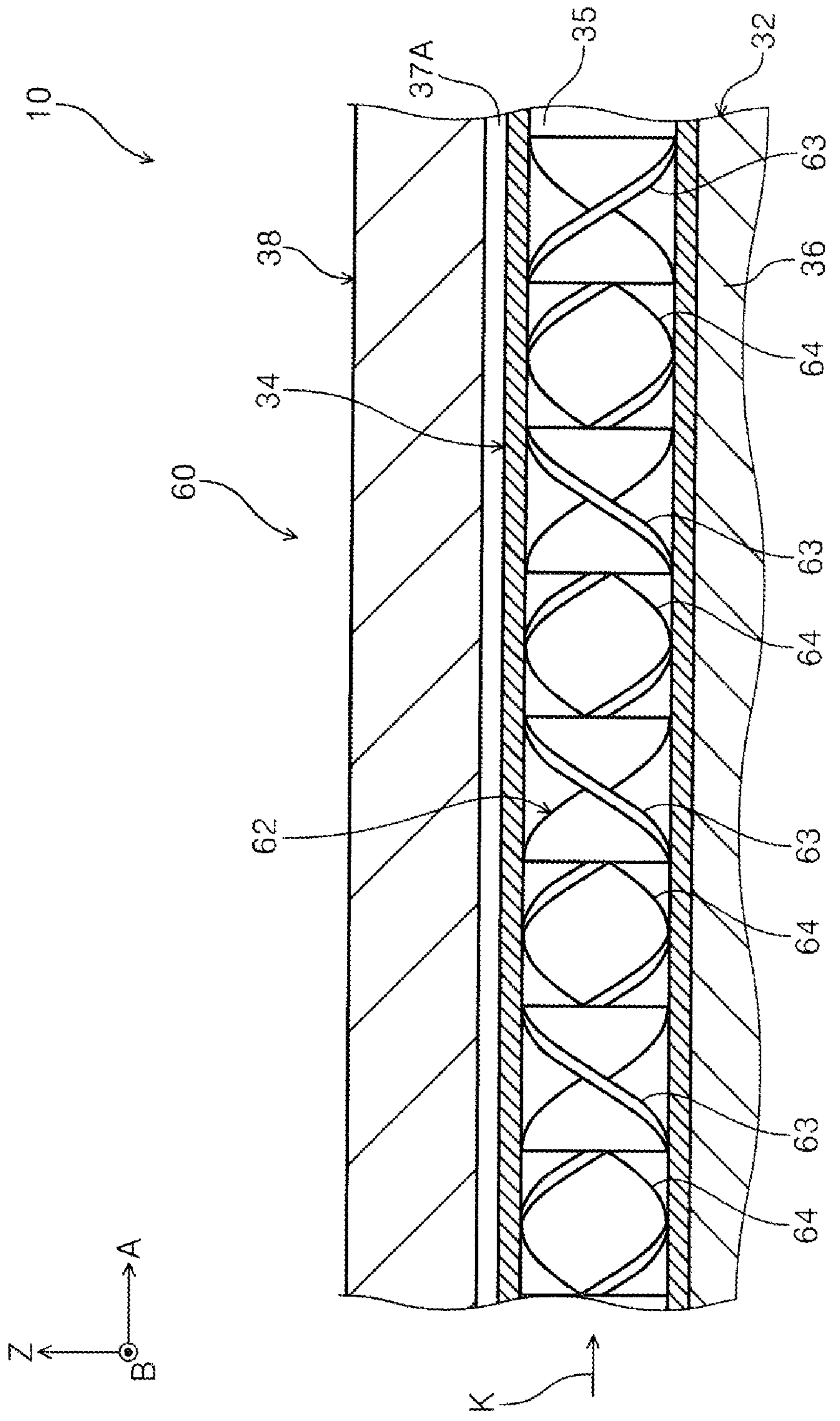
FIG. 6 is a vertical cross-sectional view illustrating a portion of a flow path unit according to a third embodiment.

As illustrated in FIG. 6, in the printer 10, the flow path unit 60 is provided in place of the flow path unit 30 (FIG. 2). The configuration of the printer 10 other than the flow path unit 60 is the same as that of the first embodiment.

The flow path unit 60 is a unit in which the ink K flows toward the recording head 18 (FIG. 2). In addition, the flow path unit 60 has a configuration in which a static mixer 62 is provided in place of the compression coil spring 42 (FIG. 4) in the flow path unit 30. The configuration of the flow path unit 60 other than the static mixer 62 is the same as that of the flow path unit 30.

The static mixer 62 is an example of the attachment portion that is attached to the inner surface 35. The static mixer 62 is formed of gold-plated brass as an example of metal. In other words, the thermal conductivity of the static mixer 62 is equal to or greater than the thermal conductivity of the stainless steel forming the flow path portion 32. The static mixer 62 includes a plurality of first elements 63 each formed by twisting a rectangular plate member by 180° in one direction, and a plurality of second elements 64 each formed by twisting the rectangular plate member by 180° in the other direction.

The static mixer 62 can stir the ink K through a dividing action by which the ink K is divided into two each time the ink K passes through each of the elements, a transposing action by which the ink K is rearranged from the center to the outer side and from the outer side to the center along a twisted surface of each of the elements, and a reversing action by which the rotation direction of the ink K is changed for each of the elements. The ink K can come into contact with the static mixer 62, and the static mixer 62 enables the ink K to flow downstream in the +A direction of the supply pipe 34.

As an example, the temperature adjustment unit 38 is disposed so as to overlap with the plurality of first elements 63 and the plurality of second elements 64 in a projected view in the Z direction.

When viewed in the +A direction, a portion of the outer periphery of the first element 63 and a portion of the outer periphery of the second element 64 are in contact with the inner surface 35. The static mixer 62 can be attached to the inner surface 35 by being bonded thereto using an adhesive, welding, or the like.

Next, actions of the flow path unit 60 according to the third embodiment will be described.

Thermal energy is transferred from the supply pipe 34 to the static mixer 62. In this way, the thermal energy is supplied to the ink K flowing through the supply pipe 34 not only from the supply pipe 34 but also from the static mixer 62, and thus it becomes easier to increase the temperature of the ink K. The ink K of the increased temperature is ejected onto the medium M at the recording head 18 (FIG. 2).

As described above, according to the flow path unit 60, as a result of the static mixer 62 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the static mixer 62 is not provided. In this way, in the configuration in which the installation space for the supply pipe 34 is limited, it is possible to prevent the heating amount for the ink K from becoming insufficient. Further, since the static mixer 62 is attached to the inner surface 35 of the supply pipe 34 in the state in which the ink K can flow, the static mixer 62 does not inhibit the ink K from flowing in the supply pipe 34.

Further, according to the flow path unit 60, even if a portion of the ink K is not heated sufficiently at a time when the ink K comes into contact with the static mixer 62, the temperature of the ink K flowing downstream in the +A direction is more easily evened out as a result of the ink K being stirred by the static mixer 62. As a result, it is possible to inhibit the ink K, partially having a low fluidity, from being supplied to the recording head 18.

Fourth Embodiment

Hereinafter, the printer 10 and a flow path unit 70 according to a fourth embodiment will be specifically described. Note that the same components as those of the printer 10 will be denoted by the same reference signs, and the description thereof will be omitted.

Figure 7:
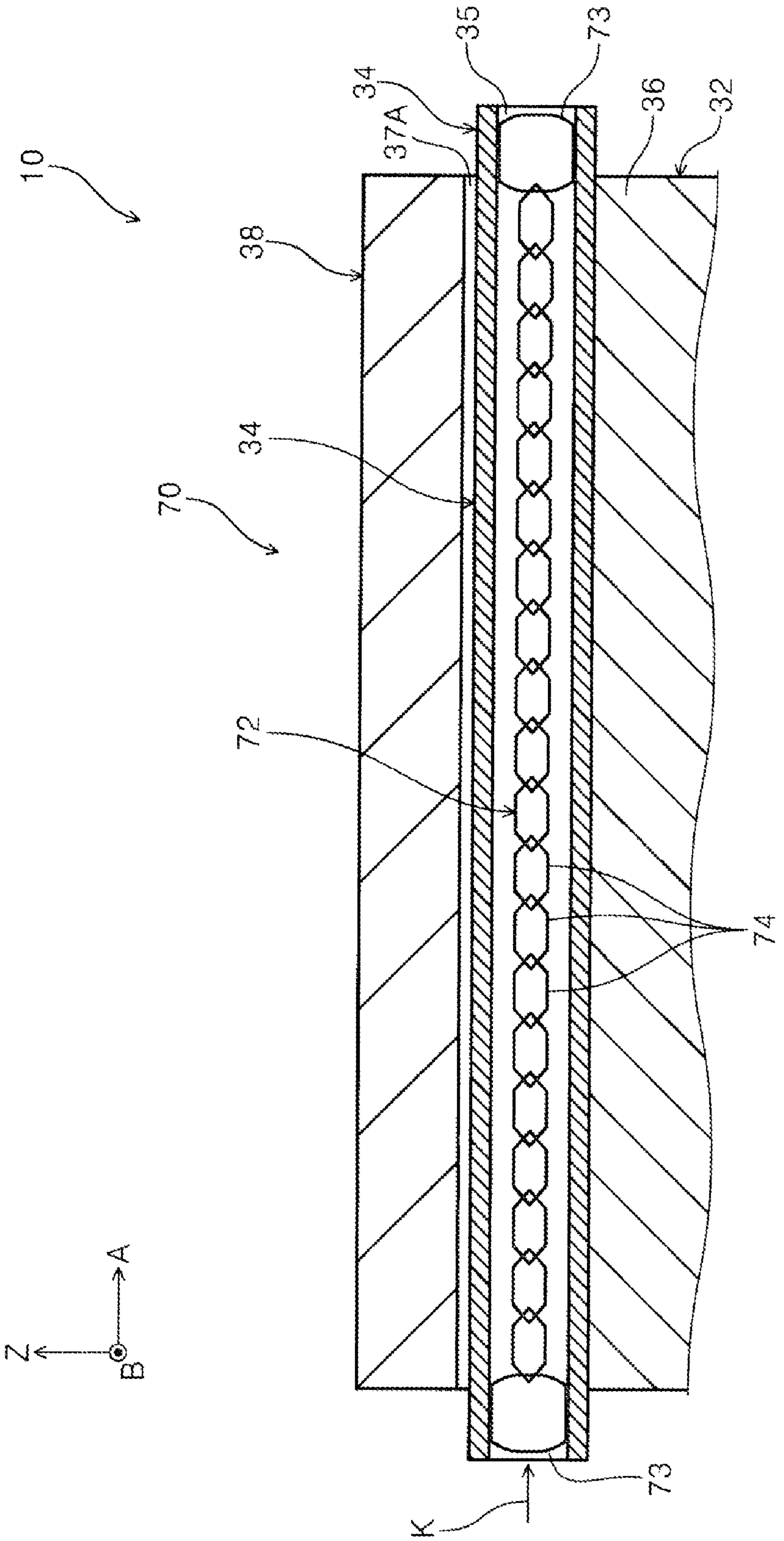
FIG. 7 is a vertical cross-sectional view illustrating a portion of a flow path unit according to a fourth embodiment.

As illustrated in FIG. 7, in the printer 10, the flow path unit 70 is provided in place of the flow path unit 30 (FIG. 2). The configuration of the printer 10 other than the flow path unit 70 is the same as that of the first embodiment.

The flow path unit 70 is a unit in which the ink K flows toward the recording head 18 (FIG. 2). In addition, the flow path unit 70 has a configuration in which a chain member 72 is provided in place of the compression coil spring 42 (FIG.

4) in the flow path unit 30. The configuration of the flow path unit 70 other than the chain member 72 is the same as that of the flow path unit 30.

The chain member 72 is an example of the attachment portion that is attached to the inner surface 35. The chain member 72 is formed of gold-plated brass as an example of metal. In other words, the thermal conductivity of the chain member 72 is equal to or greater than the thermal conductivity of the stainless steel forming the flow path portion 32. The chain member 72 includes two fixing rings 73 and a plurality of links 74.

The ink K can come into contact with the chain member 72, and the chain member 72 enables the ink K to flow downstream in the +A direction of the supply pipe 34.

The two fixing rings 73 are attached to the supply pipe 34 by being press-fitted into the supply pipe 34. The two fixing rings 73 are attached to the upstream end and the downstream end of the supply pipe 34 in the +A direction. The link 74 is formed in a hexagonal shape, for example. The link 74 is smaller than the fixing ring 73. The plurality of links 74 are linearly arranged in the A direction. The links 74 adjacent to each other in the A direction are coupled to each other. Of the plurality of links 74, the links 74 positioned at both ends in the A direction are coupled to the fixing rings 73.

As a result of the two fixing rings 73 being press-fitted to the upstream end and the downstream end of the supply pipe 34 in the +A direction inside the supply pipe 34, the plurality of links 74 are in a stretched state. Note that, in this embodiment, the plurality of links 74 in the stretched state are not in contact with the inner surface 35, but the plurality of links 74 may be configured to be in contact with the inner surface 35.

As an example, the temperature adjustment unit 38 is disposed so as to overlap with the plurality of links 74 in a projected view in the Z direction.

Next, actions of the flow path unit 70 according to the fourth embodiment will be described.

Thermal energy is transferred from the supply pipe 34 to the chain member 72. In this way, the thermal energy is supplied to the ink K flowing through the supply pipe 34 not only from the supply pipe 34 but also from the chain member 72, and thus it becomes easier to increase the temperature of the ink K. The ink K of the increased temperature is ejected onto the medium M at the recording head 18 (FIG. 2).

As described above, according to the flow path unit 70, as a result of the chain member 72 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the chain member 72 is not provided. In this way, in the configuration in which the installation space for the supply pipe 34 is limited, it is possible to prevent the heating amount for the ink K from becoming insufficient.

Further, since the chain member 72 is attached to the inner surface 35 of the supply pipe 34 in the state in which the ink K can flow, the chain member 72 does not inhibit the ink K from flowing in the supply pipe 34. Specifically, since each of the plurality of links 74 is a hollow member, the ink K easily flows through the supply pipe 34 compared to a configuration in which a solid member is used.

Fifth Embodiment

Hereinafter, the printer 10 and a flow path unit 80 according to a fifth embodiment will be specifically described. Note that the same components as those of the printer 10 will be denoted by the same reference signs, and the description thereof will be omitted.

Figure 8:
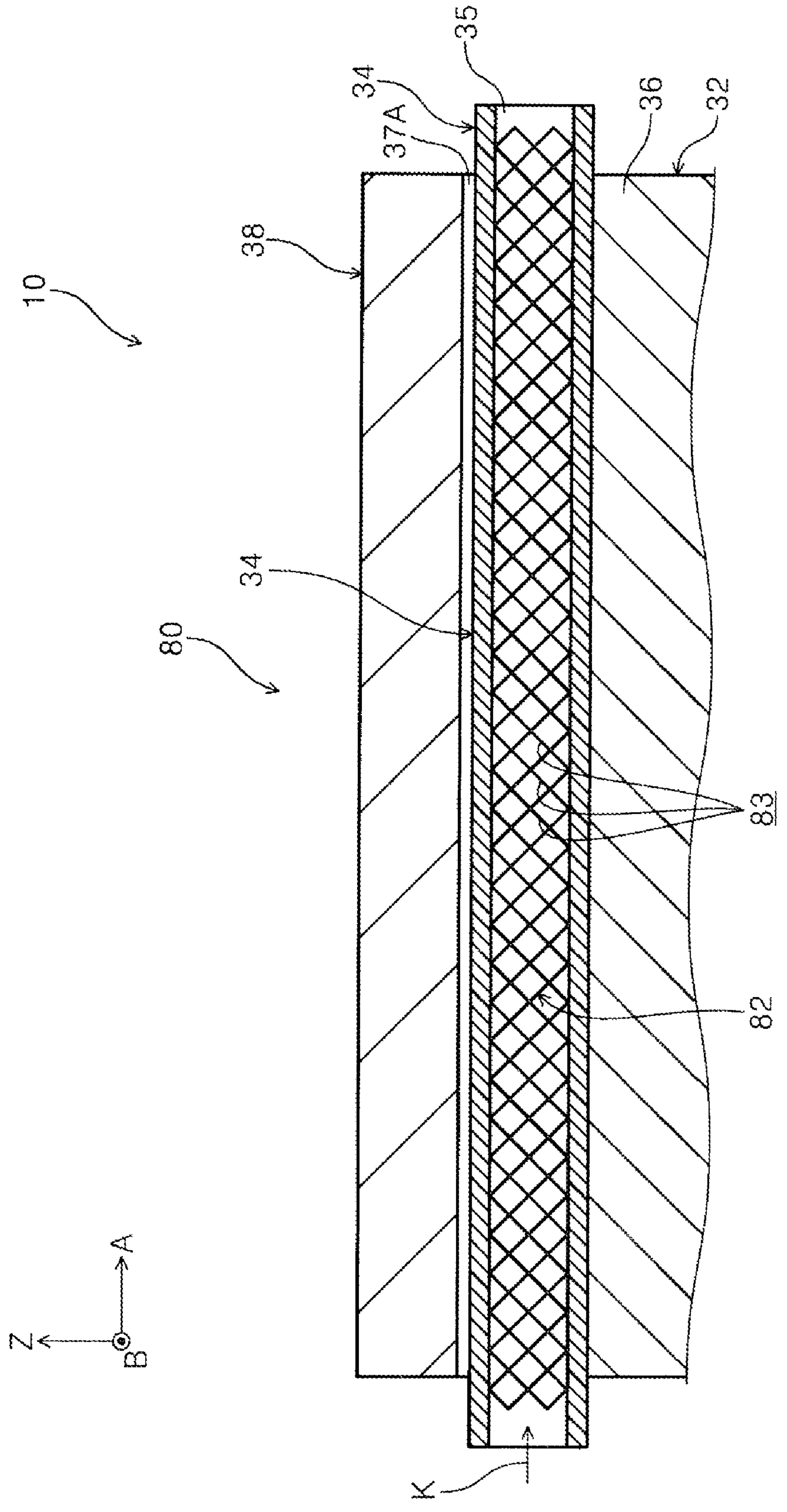
FIG. 8 is a vertical cross-sectional view illustrating a portion of a flow path unit according to a fifth embodiment.

As illustrated in FIG. 8, in the printer 10, the flow path unit 80 is provided in place of the flow path unit 30 (FIG. 2). The configuration of the printer 10 other than the flow path unit 80 is the same as that of the first embodiment.

The flow path unit 80 is a unit in which the ink K flows toward the recording head 18 (FIG. 2). In addition, the flow path unit 80 has a configuration in which a mesh member 82 is provided in place of the compression coil spring 42 (FIG. 4) in the flow path unit 30. The configuration of the flow path unit 80 other than the mesh member 82 is the same as that of the flow path unit 30.

The mesh member 82 is an example of the attachment portion that is attached to the inner surface 35. The mesh member 82 is formed of gold-plated brass as an example of metal. In other words, the thermal conductivity of the mesh member 82 is equal to or greater than the thermal conductivity of the stainless steel forming the flow path portion 32. The mesh member 82 is formed in a circular tube shape as a whole. In addition, the mesh member 82 includes a plurality of hole portions 83 arranged in a lattice pattern. The diameter of the mesh member 82 is slightly smaller than the inner diameter of the inner surface 35.

The ink K can come into contact with the mesh member 82, and the mesh member 82 enables the ink K to flow downstream in the +A direction of the supply pipe 34.

The mesh member 82 can be attached to the inner surface 35 by being bonded thereto using an adhesive, welding, or the like. A hook portion such as a pin may be provided at the inner surface 35, and a portion of the mesh member 82 may be hooked to the hook portion in order to attach the mesh member 82 to the inner surface 35.

As an example, the temperature adjustment unit 38 is disposed so as to overlap with the mesh portion 82 in a projected view in the Z direction.

Next, actions of the flow path unit 80 according to the fifth embodiment will be described.

Thermal energy is transferred from the supply pipe 34 to the mesh member 82. In this way, the thermal energy is supplied to the ink K flowing through the supply pipe 34 not only from the supply pipe 34 but also from the mesh member 82, it becomes easier to increase the temperature of the ink K. The ink K of the increased temperature is ejected onto the medium M at the recording head 18 (FIG. 2).

As described above, according to the flow path unit 80, as a result of the mesh member 82 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the mesh member 82 is not provided. In this way, in the configuration in which the installation space for the supply pipe 34 is limited, it is possible to prevent the heating amount for the ink K from becoming insufficient.

Further, since the mesh member 82 is attached to the inner surface 35 of the supply pipe 34 in the state in which the ink K can flow, the mesh member 82 does not inhibit the ink K from flowing in the supply pipe 34. Specifically, since the mesh member 82 includes the plurality of hole portions 83, the ink K easily flows through the supply pipe 34 compared to a configuration in which a solid member is used.

Sixth Embodiment

Hereinafter, the printer 10 and a flow path unit 90 according to a sixth embodiment will be specifically described.

Note that the same components as those of the printer 10 will be denoted by the same reference signs, and the description thereof will be omitted.

Figure 9:
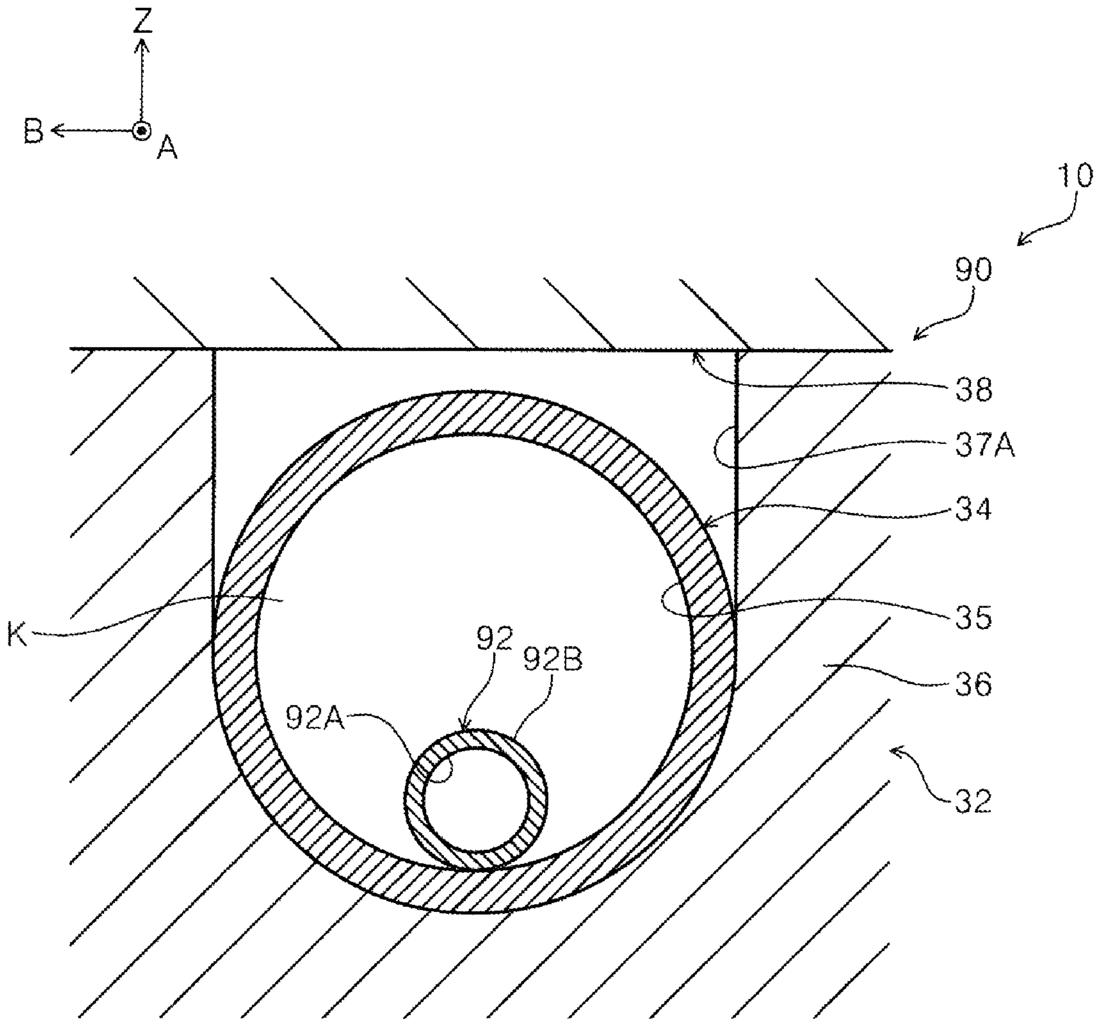
FIG. 9 is a vertical cross-sectional view illustrating a portion of a flow path unit according to a sixth embodiment.

As illustrated in FIG. 9, in the printer 10, the flow path unit 90 is provided in place of the flow path unit 30 (FIG. 2). The configuration of the printer 10 other than the flow path unit 90 is the same as that of the first embodiment.

The flow path unit 90 is a unit in which the ink K flows toward the recording head 18 (FIG. 2). In addition, the flow path unit 90 has a configuration in which an inner pipe 92 is provided in place of the compression coil spring 42 (FIG. 4) in the flow path unit 30. The configuration of the flow path unit 90 other than the inner pipe 92 is the same as that of the flow path unit 30.

The inner pipe 92 is an example of the attachment portion that is attached to the inner surface 35. The inner pipe 92 is formed of stainless steel as an example of metal. In other words, the thermal conductivity of the inner pipe 92 is equal to or greater than the thermal conductivity of the stainless steel forming the flow path portion 32. The inner pipe 92 is formed in a circular tube shape extending in the +A direction as a whole. As an example, the outer diameter of the inner pipe 92 is smaller than half the inner diameter of the supply pipe 34. The ink K can come into contact with the inner pipe 92 on both an inner circumferential surface 92A and an outer circumferential surface 92B, and the inner pipe 92 enables the ink K to flow downstream in the +A direction of the supply pipe 34.

The inner pipe 92 is attached to the inner surface 35 by welding. Specifically, a portion of the outer circumferential surface 92B of each of both end portions of the inner pipe 92 in the +A direction is welded to the inner surface 35. As a result, the inner pipe 92 is fixed to the inner side of the supply pipe 34. Note that, as an example, the inner pipe 92 is welded to the lowest section of the inner surface 35 in the +Z direction.

As an example, the temperature adjustment unit 38 is disposed so as to overlap with the inner pipe 92 in a projected view in the Z direction.

Next, actions of the flow path unit 90 according to the sixth embodiment will be described.

Thermal energy is transferred from the supply pipe 34 to the inner pipe 92. In this way, the thermal energy is supplied to the ink K flowing through the supply pipe 34 not only from the supply pipe 34 but also from the inner pipe 92, and thus it becomes easier to increase the temperature of the ink K. The ink K of the increased temperature is ejected onto the medium M at the recording head 18 (FIG. 2).

As described above, according to the flow path unit 90, as a result of the inner pipe 92 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the inner pipe 92 is not provided. In this way, in the configuration in which the installation space for the supply pipe 34 is limited, it is possible to prevent the heating amount for the ink K from becoming insufficient.

Further, since the inner pipe 92 is attached to the inner surface 35 of the supply pipe 34 in the state in which the ink K can flow, the inner pipe 92 does not inhibit the ink K from flowing through the supply pipe 34. Specifically, since the inner circumferential surface 92A and the outer circumferential surface 92B extend along the +A direction, the direction in which the ink K flows is unlikely to change to a direction intersecting the +A direction, and thus the ink K easily flows in the supply pipe 34.

Seventh Embodiment

Hereinafter, the printer 10 and a flow path unit 100 according to a seventh embodiment will be specifically described. Note that the same components as those of the printer 10 will be denoted by the same reference signs, and the description thereof will be omitted.

Figure 10:
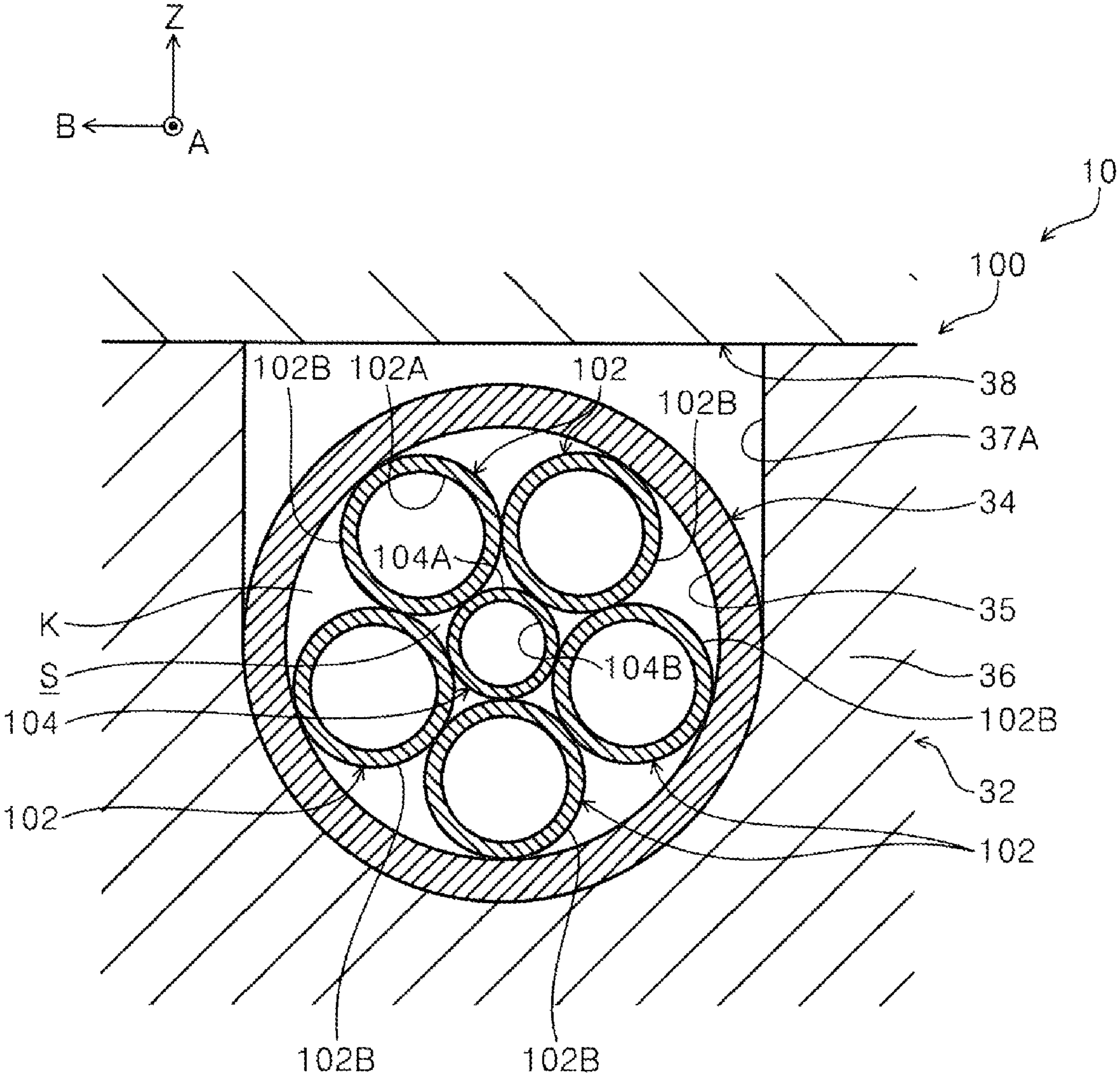
FIG. 10 is a vertical cross-sectional view illustrating a portion of a flow path unit according to a seventh embodiment.

As illustrated in FIG. 10, in the printer 10, the flow path unit 100 is provided instead of the flow path unit 30 (FIG. 2). The configuration of the printer 10 other than the flow path unit 100 is the same as that of the first embodiment.

The flow path unit 100 is a unit in which the ink K flows toward the recording head 18 (FIG. 2). In addition, the flow path unit 100 has a configuration in which five first inner pipes 102 and one second inner pipe 104 are provided in place of the compression coil spring 42 (FIG. 4) in the flow path unit 30. The configuration of the flow path unit 100 other than the first inner pipes 102 and the second inner pipe 104 is the same as that of the flow path unit 30.

The first inner pipe 102 is an example of the attachment portion that is attached to the inner surface 35. The first inner pipe 102 is formed of stainless steel as an example of metal. In other words, the thermal conductivity of the first inner pipe 102 is similar to the thermal conductivity of the stainless steel forming the flow path portion 32. The first inner pipe 102 is formed in a circular tube shape extending in the +A direction as a whole. As an example, the outer diameter of the first inner pipe 102 is smaller than half the inner diameter of the supply pipe 34. The length of the first inner pipe 102 in the +A direction is shorter than the length of the supply pipe 34 in the +A direction.

The ink K can come into contact with the first inner pipe 102 on both an inner circumferential surface 102A and an outer circumferential surface 102B, and the first inner pipe 102 enables the ink K to flow downstream in the +A direction of the supply pipe 34.

The first inner pipe 102 is attached to the inner surface 35 by welding. Specifically, a portion of the outer circumferential surface 102B of each of both end portions of the first inner pipe 102 in the +A direction is welded to the inner surface 35. As a result, the five first inner pipes 102 are fixed to the inner side of the supply pipe 34. Note that, as an example, the five inner pipes 102 are arranged so that lines (not illustrated) connecting the centers of each of circles form an equilateral pentagon when viewed in the +A direction.

The second inner pipe 104 is formed of stainless steel as an example of metal. In other words, the thermal conductivity of the second inner pipe 104 is similar to the thermal conductivity of the stainless steel forming the flow path portion 32. The second inner pipe 104 is formed in a circular tube shape extending in the +A direction as a whole. The outer diameter of the second inner pipe 104 is smaller than the outer diameter of the first inner pipe 102. The length of the second inner pipe 104 in the +A direction is substantially equal to the length of the first inner pipe 102 in the +A direction.

The ink K can come into contact with the second inner pipe 104 on both an inner circumferential surface 104A and an outer circumferential surface 104B, and the second inner pipe 104 enables the ink K to flow downstream in the +A direction of the supply pipe 34.

The first inner pipe 102 is attached to the inner surface 35 by welding. Specifically, a portion of the outer circumferential surface 102B of each of both end portions of the first inner pipe 102 in the +A direction is welded to the inner surface 35. As a result, the five first inner pipes 102 are fixed to the inner side of the supply pipe 34. Note that, as an example, the five inner pipes 102 are arranged so that lines (not illustrated) connecting the centers of each of the circles form an equilateral pentagon when viewed in the +A direction.

The second inner pipe 104 is inserted into a space S surrounded by the five outer circumferential surfaces 102B. In addition, the second inner pipe 104 is fixed as a result of both end portions thereof in the +A direction being welded to the five outer circumferential surfaces 102B. As a result, the second inner pipe 104 is arranged in a central portion of the supply pipe 34 when viewed in the +A direction. In addition, heat can be transferred from the first inner pipes 102 to the second inner pipe 104.

As an example, the temperature adjustment unit 38 is disposed so as to overlap with the first inner pipes 102 and the second inner pipe 104 in a projected view in the Z direction.

Next, actions of the flow path unit 100 according to the seventh embodiment will be described.

Thermal energy is transferred from the supply pipe 34 to the first inner pipes 102. Further, the thermal energy is transferred from the first inner pipes 102 to the second inner pipe 104. In this way, the thermal energy is supplied to the ink K flowing through the supply pipe 34 not only from the supply pipe 34 but also from the first inner pipes 102 and the second inner pipe 104, and thus it becomes easier to increase the temperature of the ink K. The ink K of the increased temperature is ejected onto the medium M at the recording head 18 (FIG. 2).

As described above, according to the flow path unit 100, as a result of the inner pipes 102 being attached to the supply pipe 34, the surface area per unit space of the portion, in the supply pipe 34, that comes in contact with the ink K is increased, and thus the heat transfer efficiency from the temperature control unit 38 to the ink K in the supply pipe 34 is improved compared to a configuration in which the first inner pipes 102 are not provided. In this way, in the configuration in which the installation space for the supply pipe 34 is limited, it is possible to prevent the heating amount for the ink K from becoming insufficient.

Further, since the first inner pipes 102 are attached to the inner surface 35 of the supply pipe 34 in the state in which the ink K can flow, the first inner pipes 102 do not inhibit the ink K from flowing in the supply pipe 34. Specifically, since the inner circumferential surface 102A and the outer circumferential surface 102B extend along the +A direction, the direction in which the ink K flows is unlikely to change to a direction intersecting the +A direction, and thus the ink K easily flows in the supply pipe 34.

In addition, as a result of the second inner pipe 104 being provided, the flow path cross-sectional area of the space S inside the five first inner pipes 102 becomes smaller than that in a configuration in which the second inner pipe 104 is not provided. In other words, since the flow path cross-sectional area becomes smaller, the flow velocity of the ink K flowing through the central portion of the supply pipe 34 increases. As a result, it is possible to inhibit a portion of the ink K from stagnating in the space S inside the five first inner pipes 102.

Modified Examples

Although the flow path units 30, 50, 60, 70, 80, 90, 100, and the printer 10 according to the first to seventh embodiments of the present disclosure basically have the configurations described above, it goes without saying that changes, omission, combinations, and the like of partial configurations can also be made without departing from the gist of the present disclosure. Hereinafter, modified examples will be described.

In the flow path unit 30, the outer diameter of the compression coil spring 42 may be the same or different at each position in the +A direction. The thermal conductivity of the compression coil spring 42 may be smaller than the thermal conductivity of the metal forming the supply pipe 34. The surface area per unit space of the compression coil spring 42 may be reduced by causing the interval between the coils to be wider at a downstream portion than at an upstream portion of the compression coil spring 42 in the +A direction. In other words, the compression coil spring 42 may include less coils in the downstream portion than in the upstream portion thereof in the +A direction. As a result, the flow path resistance received by the ink K becomes smaller the further downstream in the supply pipe 34, and the ink K easily flows to the recording head 18. In addition, it is possible to inhibit the thermal energy received by the ink K from becoming excessive downstream in the supply pipe 34.

In the flow path unit 50, the conical spring 52 may be attached to an end portion of the supply pipe 34 in the +A direction. In other words, the surface area per unit space of the portion, of the conical spring 52, that can come into contact with the ink K may increase the further downstream in the +A direction in which the ink K flows through the supply pipe 34.

The supply pipe 34 is not limited to the one having the same inner diameter at each position in the +A direction, and may have different inner diameters at each position in the +A direction. Alternatively, the inner diameter may be the same in one section of the supply pipe 34 in the +A direction, and may be varied in the other section thereof in the +A direction.

The temperature control unit 38 is not limited to the one using the planar heater, and may use a lamp heater or the like in place of the planar heater. In addition, the range in which the temperature adjustment unit 38 overlaps with the attachment portion in a projected view in the Z direction may be set to a range larger than the range described above.

The metal is not limited to aluminum, stainless steel, and brass as described above, and other metals such as copper and iron may be used. In addition, the metal is not limited to being formed of one type of metal, and may be an alloy.

What is claimed is:

1. A flow path unit through which a liquid flows toward an ejecting unit configured to eject the liquid, the flow path unit comprising:

a flow path portion formed of metal and including a flow path through which the liquid flow;

a heating unit configured to heat the flow path portion; and an attachment portion formed of metal and attached to an inner surface of the flow path, wherein the attachment portion is configured to come into contact with the liquid and cause the liquid to flow downstream in the flow path, and an outer diameter of the attachment portion is greater than or equal to a diameter of the inner surface of the flow path in an unloaded state, in which the attachment portion is not loaded in the inner surface of the flow path.

2. The flow path unit according to claim 1, wherein the attachment portion is a compression coil spring, and the compression coil spring is disposed such that a natural length direction of the compression coil spring coincides with a direction in which the liquid flows through the flow path.

3. The flow path unit according to claim 1, wherein a thermal conductivity of the attachment portion is equal to or greater than a thermal conductivity of the metal forming the flow path portion.

4. The flow path unit according to claim 1, wherein a surface area of a portion, of the attachment portion, configured to come into contact with the liquid decreases downstream in a direction in which the liquid flows through the flow path.

5. The flow path unit according to claim 1, wherein the outer diameter of the attachment portion becomes smaller than the diameter of the inner surface of the flow path in a stretched state, when the attachment portion is stretched.

6. The flow path unit according to claim 1, wherein, when the outer diameter of the attachment portion becomes smaller than the diameter of the inner surface of the flow path in a stretched state, the attachment portion is loaded into an inside of the flow path.

7. The flow path unit according to claim 6, wherein the attachment portion comes into contact with the inner surface of the flow path, when the stretch of the attachment portion is released.

8. A liquid ejecting device comprising:

an ejecting unit configured to eject a liquid;

a flow path portion formed of metal and including a flow path through which the liquid flows toward the ejecting unit;

a heating unit configured to heat the flow path portion; and an attachment portion formed of metal and attached to an inner surface of the flow path, wherein the attachment portion is configured to come into contact with the liquid and cause the liquid to flow downstream in the flow path, and an outer diameter of the attachment portion is greater than or equal to a diameter of the inner surface of the flow path in an unloaded state, in which the attachment portion is not loaded in the inner surface of the flow path.

9. The liquid ejecting device according to claim 8, wherein the outer diameter of the attachment portion becomes smaller than the diameter of the inner surface of the flow path in a stretched state, when the attachment portion is stretched.

10. The liquid ejecting device according to claim 8, wherein, when the outer diameter of the attachment portion becomes smaller than the diameter of the inner surface of the flow path in a stretched state, the attachment portion is loaded into an inside of the flow path.

11. The liquid ejecting device according to claim 10, wherein the attachment portion comes into contact with the inner surface of the flow path, when the stretch of the attachment portion is released.

* * * * *